US012662580B2

(12) United States Patent
Bosch

(10) Patent No.: US 12,662,580 B2
(45) Date of Patent: Jun. 23, 2026

(54) METHOD OF FUNCTIONALISING AN ELASTOMERIC MATERIAL AND THE USE THEREOF IN RUBBER FORMULATIONS

(71) Applicant: Rubber Nano Products (Proprietary) Limited, Gqeberha (ZA)

(72) Inventor: Robert Michael Bosch, Gqeberha (ZA)

(73) Assignee: Rubber Nano Products (Proprietary) Limited, Gqeberha (ZA)

( * ) Notice: Subject to any disclaimer, the term of this patent is extended or adjusted under 35 U.S.C. 154(b) by 186 days.

(21) Appl. No.: 18/558,912

(22) PCT Filed: May 3, 2022

(86) PCT No.: PCT/IB2022/054061

§ 371 (c)(1),
(2) Date: Nov. 3, 2023

(87) PCT Pub. No.: WO2022/234443

PCT Pub. Date: Nov. 10, 2022

(65) Prior Publication Data

US 2025/0257183 A1 Aug. 14, 2025

(30) Foreign Application Priority Data

May 4, 2021 (ZA) .................................. 2021/02983

(51) Int. Cl.
*C08J 7/14* (2006.01)
*C08K 3/06* (2006.01)
(Continued)

(52) U.S. Cl.
CPC .................. *C08J 7/14* (2013.01); *C08K 3/06* (2013.01); *C08K 3/36* (2013.01); *C08K 5/47* (2013.01);
(Continued)

(58) Field of Classification Search
CPC ................................ C08J 7/14; C08J 2317/00
See application file for complete search history.

(56) References Cited

U.S. PATENT DOCUMENTS

2007/0060711 A1 3/2007 Perera
2015/0315363 A1* 11/2015 Jasiunas ................... C08L 9/06
523/156
2016/0152805 A1 6/2016 Jasiunas

FOREIGN PATENT DOCUMENTS

CN 109749123 A 5/2019
EP 2914635 A1 9/2015
(Continued)

OTHER PUBLICATIONS

International Search Report issued Aug. 31, 2022 in PCT/IB2022/054061.

(Continued)

*Primary Examiner* — Robert A Vetere
(74) *Attorney, Agent, or Firm* — ICE MILLER LLP

(57) ABSTRACT

A method of functionalising an elastomeric material, such as a rubber particle, is provided. The method comprises the functionalisation of an elastomeric material through the use of an ionic liquid based composition, which comprises a water soluble polymer, a cationic silicate component, and a salt of a vulcanization accelerator, together with a zinc compound, sulphur, and an accelerator. Rubber particles, for example particles from recycled rubber products, functionalised according to the method disclosed can successfully be utilised in virgin rubber masterbatches at concentrations not previously possible.

16 Claims, 7 Drawing Sheets

(51) Int. Cl.
  *C08K 3/22*          (2006.01)
  *C08K 3/36*          (2006.01)
  *C08K 5/47*          (2006.01)
(52) U.S. Cl.
  CPC ........ *C08J 2317/00* (2013.01); *C08J 2400/22*
       (2013.01); *C08J 2400/26* (2013.01); *C08J*
     *2407/00* (2013.01); *C08J 2471/02* (2013.01);
                  *C08K 2003/2296* (2013.01)

(56)          References Cited

FOREIGN PATENT DOCUMENTS

| | | | |
|---|---|---|---|
| EP | 2947116 A2 | 11/2015 | |
| JP | 2019026758 A | 2/2019 | |
| WO | 2014042510 A1 | 3/2014 | |
| WO | 2018200340 A1 | 11/2018 | |
| WO | WO-2019145808 A1 * | 8/2019 | .............. C08L 71/02 |

OTHER PUBLICATIONS

Written Opinion issued Aug. 31, 2022 in PCT/IB2022/054061.
Roberts, John D., et al., "Basic Principles of Organic Chemistry," California Institute of Technology, W.A. Benjamin, Inc,., New York, NY, 1965, Chapter 10, pp. 270-273 and Chapter 29, p. 1092.
Streitweiser, Andrew, Jr., et al., "Organic Chemistry," Macmillan Publishing Co., New York, NY, 1976, Chapter 20, pp. 546-550.
Buades, Victori Sanz, et al., "Multilayer Granular Recycles Rubber for its Application to Technical Flooring," Sustainability, 2022, 14 pages, 16372.

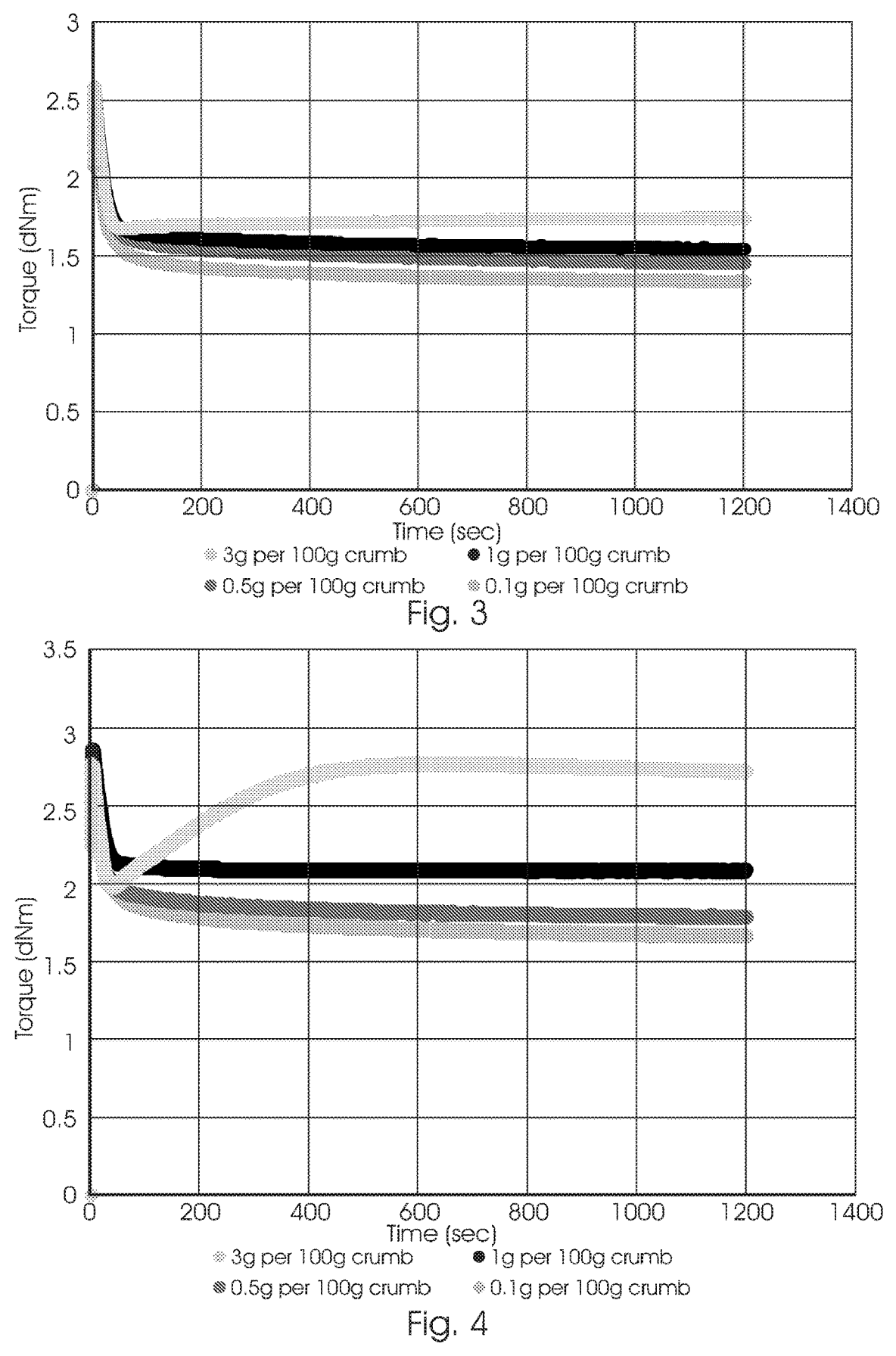

* cited by examiner 3g per 100g crumb          1g per 100g crumb
0.5g per 100g crumb          0.1g per 100g crumb

Fig. 3

3g per 100g crumb          1g per 100g crumb
0.5g per 100g crumb          0.1g per 100g crumb

Fig. 4

METHOD OF FUNCTIONALISING AN ELASTOMERIC MATERIAL AND THE USE THEREOF IN RUBBER FORMULATIONS

CROSS-REFERENCE TO RELATED APPLICATIONS

This application is a Section 371 of International Application No. PCT/IB2022/054061 filed May 3, 2022, which was published under International Publication No. WO 2022/234443 A9, which claims priority to South African patent application 2021/02983, filed May 4, 2021, the disclosures of which are incorporated herein by reference in their entireties.

INTRODUCTION

This invention relates to a method of functionalising an elastomeric material. In particular, the invention relates to a method of functionalising an elastomeric material comprising the use of an ionic liquid based composition together with a zinc compound, sulphur, and an accelerator.

BACKGROUND

The recycling of elastomeric materials, including previously cured or vulcanised rubber products such as tyres, hoses, and belts, has remained a challenge in the industry despite the significant levels of attention it has received.

It is well known to those skilled in the art that one of the key issues with reworking or recycling previously cured materials, is that during the vulcanisation reaction strong carbon-sulphur and sulphur-sulphur bonds form, which are extremely stable, and therefore difficult to reverse. Accordingly, to date, these previously cured rubber products have only found applications where chemical reintegration of the material is not required, for example when utilised as a filler.

One of the strategies to increase the use of these recycled rubber materials is to devulcanise the material to regain some of its original properties, thereby allowing reformulation into new rubber (virgin rubber). There are several publications dealing with devulcanisation processes but to date these processes have not produced material that is commercially viable, or material that can be used in high loadings in technical rubber applications.

The applicant's own international PCT patent application WO 2019/145808 discloses a rubber vulcanization composition which is a water soluble polymer based solution comprising a cationic silicate component and a cationic additive component which is a salt of a vulcanization accelerator. The disclosure of WO 2019/145808 is incorporated herein by reference in its entirety.

The inventor has now surprisingly found that an ionic liquid based composition comprising a water soluble polymer, a cationic silicate component, and a salt of a vulcanization accelerator, together with a zinc compound, sulphur, and an accelerator functionalises elastomeric material, including rubber particles, thereby enabling the use of these functionalised particles in rubber master batches at levels previously unknown. It has further been found that new rubber products, incorporating the functionalised rubber particles show unexpected performance compared to similar rubber formulations not comprising these functionalised rubber particles.

According to a first aspect to the present invention there is provided a method of functionalising an elastomeric material, the method comprising the steps of:

a) providing an elastomeric material having a surface to be functionalised, b) providing an ionic liquid based composition comprising a water soluble polymer, a cationic silicate component, and a salt of a vulcanization accelerator, c) providing a zinc compound, sulphur, and an accelerator, d) contacting the ionic liquid based composition of step b) and the components of step c) with the elastomeric material surface, thereby to produce a functionalised elastomeric material.

In one embodiment, the elastomeric material is an elastomeric particle.

In one embodiment, the elastomeric particle has a particle size in the range of about 10 to about 400 mesh.

In a preferred embodiment, the elastomeric material is selected from the group consisting of reclaimed elastomeric materials, ground rubber, scorched rubber, and micronized rubber powder.

In a particularly preferred embodiment, the elastomeric material is a vulcanised elastomeric material.

In one embodiment, the elastomeric material is a recycled tyre rubber.

In one embodiment, the ionic liquid based composition further comprises one or more of a reinforcing filler and a thermoplastic elastomer.

In another embodiment, the method further comprises mixing the elastomeric material of step a) with a reinforcing filler.

In one embodiment, the reinforcing filler is based on precipitated silica, optionally a silane-treated amorphous precipitated silica.

In one embodiment, the vulcanization accelerator in the ionic liquid based composition of step b) is selected from a group of accelerator classes including thiazoles, dithiocarbamates, dithiophosphates, sulfenamides, thiuram sulfides, xanthates, guanidines, and aldehyde amines.

In one embodiment, the salt of a vulcanization accelerator in the ionic liquid based composition of step b) is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof, and wherein the salt of the vulcanization accelerator is a sodium or potassium salt thereof.

In a preferred embodiment, the cation of the cationic silicate component is a sodium or potassium cation.

In a preferred embodiment, the water soluble polymer is an ethylene oxide polymer or polyvinyl alcohol polymer.

In a particularly preferred embodiment, the water soluble polymer is polyethylene glycol.

In one embodiment, the ionic liquid based composition comprises polyethylene glycol, sodium metasilicate and accelerator salt NaBEC.

In one embodiment, the accelerator of step c) is selected from a group of accelerator classes including thiazoles, dithiocarbamates, dithiophosphates, sulfenamides, thiuram sulfides, xanthates, guanidines, and aldehyde amines.

According to a second aspect to the present invention there is provided a use of an ionic liquid based composition and a zinc compound, sulphur, and an accelerator for functionalising an elastomeric material, wherein the ionic liquid based composition comprises a water soluble polymer, a cationic silicate component, and a salt of a vulcanization accelerator.

In one embodiment, the ionic liquid based composition further comprises one or more of a reinforcing filler and a thermoplastic elastomer.

According to a third aspect to the present invention there is provided a method of recycling rubber, comprising the steps of:

a) providing a functionalised elastomeric material according to the method of the first aspect of the invention, b) providing a synthetic or natural rubber master batch comprising virgin rubber, c) mixing the functionalised elastomeric material of step a) with the master batch of step b), and vulcanizing the mixture, thereby to produce a final rubber product comprising recycled rubber and virgin rubber.

In one embodiment, the final rubber product comprises recycled rubber at a concentration of about 1 to about 80 wt % based on the total weight of the final rubber product.

In one embodiment, the final rubber product is a product selected from the group consisting of tyres, hoses, conveyor belts, and other technical rubber goods.

According to a further aspect to the present invention there is provided a rubber product obtained according to the method according to the third aspect of the invention, wherein the product is a product selected from the group consisting of tyres, hoses, conveyor belts, and other technical rubber goods.

In one embodiment, the product is tyre tread and wherein the tread has improved performance compared to tread not comprising any recycled rubber, which performance is selected from one or more of rolling resistance, wear resistance, wet grip, or combinations thereof.

BRIEF DESCRIPTION OF THE DRAWINGS

The invention will now be described in more detail with reference to the following non-limiting embodiments and figures in which:

FIG. 3 shows the rheometry of NR coated rubber crumb at different coating ratios utilising functionalisation Formulation S−;

FIG. 4 shows the rheometry of NR coated rubber crumb at different coating ratios utilising functionalisation Formulation S+;

DETAILED DESCRIPTION OF A PREFERRED EMBODIMENT

Figure 1:
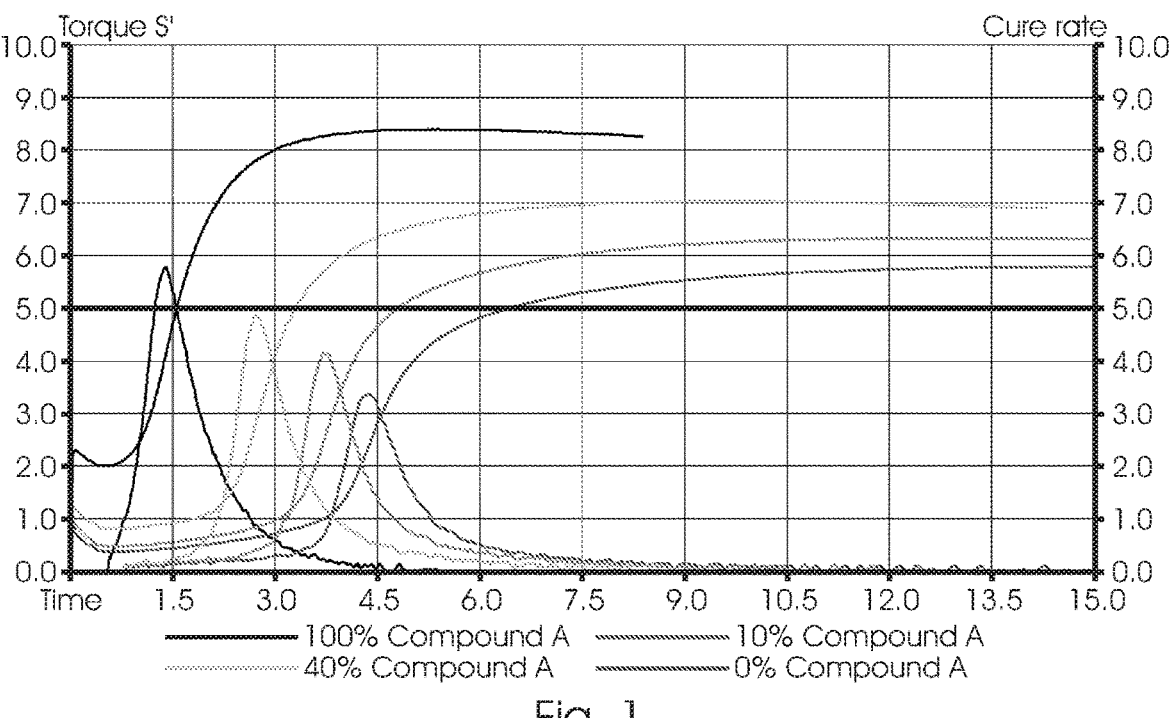
FIG. 1 shows the cure rate and torque response of various rubber formulations comprising the functionalised elastomeric material of the present invention.

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

As used in this specification, the term "water soluble polymer" should be understood to mean a polymer that dissolves, disperses, or swells in water including polymers comprising hydroxyl groups, for example an ethylene oxide type polymer or a polyvinyl alcohol polymer.

As used in this specification, the term "elastomeric material" should be understood to mean a polymer that displays rubber-like elasticity. The elastomeric material comprises unsaturated double bonds (whether previously engaged in a crosslink or not) that can accept new sulphur crosslinks when exposed to the ionic liquid based composition, and the further components, according to the method of the invention as disclosed herein.

The present invention provides for a method of functionalising an elastomeric material. The method of functionalisation comprises the steps of: a) providing an elastomeric material having a surface to be functionalised, b) providing an ionic liquid based composition comprising a water soluble polymer, a cationic silicate component, and a salt of a vulcanization accelerator, c) providing a zinc compound, sulphur, and an accelerator, and d) contacting the ionic liquid based composition of step b) and the components of step c) with the elastomeric material surface, thereby to produce a functionalised elastomeric material.

The functionalisation of the elastomeric material is achieved through the use of an ionic liquid composition in conjunction with a combination of additional components including a zinc compound, sulphur, and an accelerator.

Without thereby wishing to be bound by any particular theory, it is believed that the ionic liquid based composition allows for the formation of pendant groups (sulphur-accelerator species which are derived from the composition of the accelerator). These pendant groups are activated from sulphur-accelerator interactions, in the presence of the zinc compound (ZnO), in the ionic liquid based composition. Surprisingly, it appears that the chemistry described above occurs at very low temperatures compared to the temperatures used in traditional vulcanization reactions. It is expected that contact of only a few minutes at a mild temperature of about 80° C. will allow these pendant groups to form and react to any available diene sites on the elastomeric material surface. This occurs even if the elastomeric material is not heated to its melting point (unvulcanized rubber), and occurs on the solid surface of the elastomeric material.

In one embodiment of the invention, the elastomeric material to be functionalised is first brought into contact with the ionic liquid based composition. Alternatively, in another embodiment of the invention, the ionic liquid based composition is mixed with the zinc compound, sulphur, and accelerator to prepare a functionalisation medium, which is then brought into contact with and mixed with the elastomeric material. The conditions of surface processing are mild in temperature and can work both in situ during mixing, or ex-situ by preparation of a pre-reacted medium before functionalisation.

The salt of the vulcanization accelerator in the ionic liquid based composition may be selected from a group of accelerator classes including thiazoles, dithiocarbamates, dithiophosphates, sulfenamides, thiuram sulfides, xanthates, guanidines, aldehyde amines, or combinations thereof.

The ionic liquid composition used in the method of the present invention is prepared according to the method disclosed in the applicant's prior international patent application, WO 2019/14580, which is incorporated herein by reference in its entirety.

The ionic liquid composition used to prepare the functionalised elastomeric material is a non-aqueous polymer based composite material that results in either an oil or frozen wax material. In rubber manufacturing, the composition is suitable for direct addition to rubber-like materials in normal mixing equipment in a standard rubber manufacturing environment. The polymer is a water soluble polymer, for example, an ethylene oxide type polymer, a polyvinyl alcohol polymer, or any other polymer comprising hydroxyl groups.

The ionic liquid composition which is used in the method to prepare the functionalised elastomeric material is itself prepared by providing a suitable cationic silicate component solution, which is synthesized by dissolving silica powder in a basic solution, for example sodium hydroxide or potassium hydroxide.

The resultant cationic silicate component is added to a water soluble polymer, for example an ethylene oxide polymer including polyethylene glycol, and dried to produce a stable ionic liquid of the particular cationic silicate component.

The particular combination of the cation silicate component and the polymer, for example polyethylene glycol, as a replacement for the aqueous environment, allows for a suitably stable ionic liquid.

These cationic silicate solutions and the resultant cationic-silicate polymer compositions or complexes can be prepared by reacting different ratios of the selected cation to silica, thereby to modify the surface chemistry and the ionic nature of the ionic liquid. For example, a stoichiometric ratio of cation to silica may be used. Alternatively, this ratio may be varied depending on the requirements of the particular system to be functionalised.

The cationic silicate-polymer carrier composition is suitable for the dissolution and stabilisation of several ionic materials that are known to be useful or beneficial in the vulcanization of rubber, for example various salts or nanopowders, such as graphene oxide or zinc oxide, or any other suitable ionic material that may dissolved in or dispersed in the cationic silicate-polymer composition.

The ionic liquid composition further comprises a salt of a vulcanization accelerator. The salt of a vulcanization accelerator is dissolved in the cationic silicate component and water soluble polymer carrier described above. The accelerator salt complex may be prepared in a caustic aqueous solution, for example a solution of sodium hydroxide or potassium hydroxide. The accelerator salt complex may be prepared by dissolving sodium hydroxide or potassium hydroxide in water before reaction with the accelerator fragment. The accelerator salt complex may also be prepared in a suitable azeotrope of water and alcohol. In a preferred method of the present invention, the accelerator salt complex is prepared in a water isopropyl alcohol azeotrope mixture.

The accelerator component may be selected from any one of the accelerators known in the art. In particular, the accelerator may be selected from a group of accelerator classes including thiazoles, dithiocarbamates, dithiophosphates, sulfenamides, thiuram sulfides, xanthates, guanidines, aldehyde amines, or combinations thereof.

The accelerator may be selected from a group of accelerator classes including thiazoles, dithiocarbamates, dithiophosphates, thiuram sulphides, or combinations thereof. Preferably, the salt of a vulcanization accelerator is a sodium or potassium salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Diisopropyl xanthogen disulphide (DIXD) or polysulfide (AS100), or combinations thereof.

The accelerator salt solution is added to the cationic silicate solution to prepare a reaction mixture to which the water based polymer is added. The resultant reaction mixture is then dried to remove the solution medium, in particular to remove any water from the system. In one embodiment, the mixture may be dried under vacuum, for example at 100 mBar or less, to remove the solution medium. The resultant composition is a non-aqueous composition which is based on the water soluble polymer, for example polyethylene glycol. The composition comprises a single phase with no layers of separation (organic or aqueous).

In one embodiment, the accelerator salt complex, and the cationic silicate component may be selected such that the cation portion of the additive component and silicate component of the composition are the same, although different combinations may also be selected.

The accelerator salt complex and the cationic silicate component may comprise about 50% of the total mass of the polymer based composition, with the water based polymer component making up the rest of the composition.

The elastomeric material to be functionalised according to the invention may in one embodiment be an elastomeric particle. Although it is envisaged that the method of functionalisation described herein will be equally applicable to all elastomeric surfaces and particles (having suitable diene group chemistry allowing sulphur-vulcanization), the elastomeric particles to be functionalised preferably has a particle size in the range of about 10 to about 400 mesh. The average particle size of the elastomeric particles will depend on the source of the material to be functionalised, and the method by which it was processed. For example, elastomeric particles in the size range of about 10 to about 30 mesh are typically from ground tyre rubber, while particles having a smaller particle size which is within the range of about 40 to about 300 mesh are generally considered to be micronized rubber powder.

In a preferred embodiment of the invention, the elastomeric material to be functionalised for further processing is selected from the group consisting of reclaimed elastomeric materials, ground rubber, scorched rubber, and micronized rubber powder. As will be appreciated by those skilled in the art, in a particularly desirable application, the material to be functionalised is preferably a previously vulcanised elastomeric material, including those listed above. However, the elastomeric material to be functionalised need not be a previously vulcanised material.

In a particularly preferred embodiment of the invention, the material to be functionalised is any form of elastomeric material or particle that originates from previously used tyres, or end-of-life tyres, irrespective of the method of preparation of such particles. These particles are generally classified as rubber chips, rubber crumb, ground tyre rubber (GTR), or micronized rubber particles (MRP), depending on the method of preparation and the resultant average particle size. These particles can be prepared according to any method known to those skilled in the art including mechanical cutting and grinding, cryogenic freezing based methods, and pyrolysis based methods.

In some embodiments of the invention, it may be beneficial for ease of product processing for the ionic liquid based composition to include a thermoplastic elastomer. The thermoplastic elastomer may be any elastomer with a melting point in the region of about 50° C. to about 100° C. Preferably, the thermoplastic elastomer does not contain any diene unsaturation. Preferably, the thermoplastic elastomer is selected from the group consisting of polyolefinic elastomers and have suitable softening and hardness points to allow for easier coating and blending in the required mixing conditions during the coating process. Furthermore, the thermoplastic elastomer should also have sufficient thermal stability to not degrade near any of the working temperatures of the vulcanization and post processing conditions of the final rubber composition.

Preferably, the thermoplastic elastomer is present at a concentration of about 10 to about 60 wt. %, more preferably about 15 to about 55 wt. %, more preferably about 15 to about 50 wt. %, even more preferably about 15 to about 45 wt. %, and most preferably about 20 to about 40 wt. %, by weight of the ionic liquid based composition.

In some further embodiments of the invention, in particular where a thermoplastic elastomer is not present in the ionic liquid based composition, it may be desirable for the method to include the further step of providing a reinforcing filler, and mixing the reinforcing filler with the ionic liquid based composition and the further components (the zinc compound, sulphur, and the accelerator) in a heated environment under shear conditions. The mixture must be allowed to coat the elastomeric material completely whilst exposed to sufficient temperature to allow the vulcanisation initiation reactions to begin. In one embodiment of the invention, the reinforcing filler is based on precipitated silica, and is preferably a silane-treated amorphous precipitated silica.

The ionic liquid based composition used in the method of the invention comprises a water soluble polymer, a cationic silicate component, and a salt of a vulcanization accelerator. In addition thereto, components or a mixture of components including a zinc compound, sulphur, and a further accelerator is used in the method (step (c) of the method). The accelerator in the mixture of components used in step (c) of the method need not be the same as the accelerator fragment of the accelerator salt in the ionic liquid based composition. The accelerator of step c) may be selected from any known accelerator, but is preferably selected from a group of accelerator classes including thiazoles, dithiocarbamates, dithiophosphates, sulfenamides, thiuram sulfides, xanthates, guanidines, and aldehyde amines.

Preferably, the amount of ionic liquid based composition comprises about 0.5 to about 2 wt. %, based on the total weight of the components of steps (a)-(c) of the method of the invention.

Preferably, the amount of elastomeric material comprises about 40 to about 95 wt. %, based on the total weight of the components of steps (a)-(c) of the method of the invention.

Preferably, the amount of the zinc compound comprises about 0.2 to about 1 wt. %, based on the total weight of the components of steps (a)-(c) of the method of the invention.

Preferably, the amount of sulphur comprises about 0.2 to about 1 wt. %, based on the total weight of the components of steps (a)-(c) of the method of the invention.

Preferably, the amount of the accelerator of step (c) comprises about 0.2 to about 1 wt. %, based on the total weight of the components of steps (a)-(c) of the method of the invention.

Preferably, the amount of reinforcing filler comprises about 20 to about 50 wt. %, based on the total weight of the components of steps (a)-(c) of the method of the invention.

The invention further provides for a method of recycling rubber, comprising the steps of: a) providing a functionalised elastomeric material prepared according to the method disclosed herein, b) providing a synthetic or natural rubber master batch comprising virgin rubber, c) mixing the functionalised elastomeric material of step a) above with the master batch of step b) above, and vulcanizing the mixture, thereby to produce a final rubber product comprising recycled rubber and virgin rubber.

The invention further provides for a rubber product including recycled elastomeric material functionalised according to the method disclosed herein. The final rubber product may include such recycled elastomeric material at a concentration of about 1 to about 80 wt. %, preferably about 3 to about 70 wt. %, preferably about 5 to about 60 wt. %, most preferably about 10 to about 50 wt. % based on the total weight of the final rubber product.

It will be appreciated by those skilled in the art that the functionalised elastomeric material prepared according to the method of the present invention will find application in all rubber products. However, particularly preferred examples of such rubber products incorporating the functionalised material of the present invention includes tyres, hoses, conveyor belts, and other technical rubber goods.

The invention will now be described in more detail with reference to the following, non-limiting, examples and experimental results.

Example 1: Preparation of Compound A Using MRP 40 mesh, PxActi8, Sulphur, TBBS, and ZnO As shown in Table 1, a mesh 40 rubber crumb elastomeric material was obtained from SN Rubber, South Africa. The rubber crumb material was prepared by conventional mechanical grinding and contained 50%±10% natural rubber ("NR"). The rubber crumb (241 g) was mixed with 2.5 g of the ionic liquid based composition referred to as "PxActi8" in Table 1 below comprising (1) polyethylene glycol, (2) sodium metasilicate, (3) sodium dibenzyldithio-carbamate (NaBEC), (4) silica, and (5) thermoplastic elastomer ("TPE") in the ratio of (1+2+3):4:5 is 50:30:20, and 2 g sulphur, 1 g ZnO, and 1 g N-tert-butyl-benzothiazole sulfonamide (TBBS) accelerator, and other standard rubber compounds.

These components were mixed for 10 minutes at about 80° C. inside an internal mixer. The material combined and the components appeared to melt onto the surface of the rubber crumb. This mixture was then processed further by adding virgin NR into the material until the material worked like a normal rubber, and could be dumped out the internal mixer, and rolled acceptably on a calendar mill. This material is therefore a combination of recycled functionalised rubber crumb and NR. Details of the formulation for Compound A is provided in Table 1 below.

TABLE 1

| Recycled rubber formulation, referred to herein as Compound A | |
|---|---|
| Component | Mass (g) |
| MRP 40 mesh | 241 |
| PxActi8 | 2.5 |
| silica VN3 | 1 |
| Si69 | 1 |
| Sulphur | 2 |
| TBBS | 1 |
| ZnO | 1 |
| NR | 140 |
| Total | 389.5 |

The recycled content of Compound A is 61.8% recycled rubber. Compound A was designed to be formulated with Compound B (see below) to produce formulations with increasing concentration of recycled content (Compound A) for further testing.

Example 2: Preparation of Compound B (No Recycled Content)

As shown in Table 2 below, in this experiment we merely prepared a standard NR rubber formulation which was used in further testing of mixtures with Compound A to determine performance of rubber formulations comprising various levels of recycled content.

TABLE 2

| Standard NR rubber formulation, referred to herein as Compound B | |
|---|---|
| Component | Mass (g) |
| NR | 100 |
| Peptiser | 1.5 |
| Napthenic oil | 3 |
| PVI | 0.63 |
| Stearic acid | 1 |
| N375 | 10 |
| Si69 | 5 |
| Total | 121.13 |

The formulation of Compound B does not contain any recycled content.

This material was mixed in an internal mixer using standard mixing times and standard operating procedures. The material was prepared to have addition Si69 to allow it to be tested for further addition of silica filler (a design requirement of this compound). These formulations are not shown but are mentioned as the intention was now to use recycled content and filler content additions to achieve a wide range of properties of this parent compound.

Example 3: Testing of Various Formulations Comprising Compound A/Compound B

The Compounds A and B are now derived after internal mixing. They are now calendared and prepared as a thick sheet of NR rubber compound.

Compound A has some potential to crosslink as it contains a small cure package on the surface of the recycled material. Compound B is without cure package and needs a cure package to vulcanize.

As can be seen from Table 3 below, Compound A and Compound B were mill mixed together in different mass ratios. These ratios started from 0% of the recycled material containing Compound A, and the trend was finished with testing pure Compound A.

TABLE 3

Compound A/Compound B formulations, corrected for curable rubber per masterbatch

| Compound A | 0 | 10 | 20 | 30 | 40 | 50 | 60 | 70 | 80 | 100 |
|---|---|---|---|---|---|---|---|---|---|---|
| Compound B | 100 | 90 | 80 | 70 | 60 | 50 | 40 | 30 | 20 | 0 |
| ZnO | 2.5 | 2.34 | 2.18 | 2.02 | 1.86 | 1.7 | 1.54 | 1.38 | 1.22 | 0.9 |
| TBBS | 1.5 | 1.4 | 1.31 | 1.21 | 1.12 | 1.02 | 0.92 | 0.83 | 0.73 | 0.54 |
| S8 | 1.5 | 1.4 | 1.31 | 1.21 | 1.12 | 1.02 | 0.92 | 0.83 | 0.73 | 0.54 |

Table 3 above shows the formulary and also how a standard cure package (as shown in Compound A content of 0%, i.e. pure Compound B) is then adjusted for the actual pure rubber content of each of these mixes. The reason for this is to keep the actual cure package related to the actual virgin rubber that can be cured.

TABLE 4

Test results for the various Compound A/Compound B formulations containing 0% Compound A, 10% Compound A, 40% Compound A, and 100% Compound A.

| Compound | S' Max | S'Min | Scorch Time (TS 1) | Scorch Time (TS 2) | TC10 | TC90 | TC95 | TC100 | TC90 − TC10 | Time to Peak Rate (S') | Peak Rate (S'/min) |
|---|---|---|---|---|---|---|---|---|---|---|---|
| Mesh40 | 8.39 | 1.99 | 1.17 | 1.36 | 1.06 | 2.64 | 3.11 | 5.30 | 1.58 | 1.39 | 5.76 |
| 0RA8 | 5.78 | 0.36 | 4.00 | 4.35 | 3.53 | 7.24 | 8.83 | 15.20 | 3.71 | 4.36 | 3.38 |
| 10RA8 | 6.33 | 0.46 | 3.40 | 3.70 | 3.11 | 6.21 | 7.54 | 12.64 | 3.10 | 3.72 | 4.14 |
| 40RA8 | 7.02 | 0.80 | 2.46 | 2.69 | 2.31 | 4.61 | 5.54 | 9.63 | 2.31 | 2.71 | 4.86 |
| Maximum | 8.39 | 1.99 | 4.00 | 4.35 | 3.53 | 7.24 | 8.83 | 15.20 | 3.71 | 4.36 | 5.76 |

"Mesh 40" denotes a formulation comprising 100% Compound A, "0RA8" denotes a formulation comprising 0% Compound A, "10RA8" denotes a formulation comprising 10% Compound A, and "40RA8" denotes a formulation comprising 40% Compound A.

Figure 2:
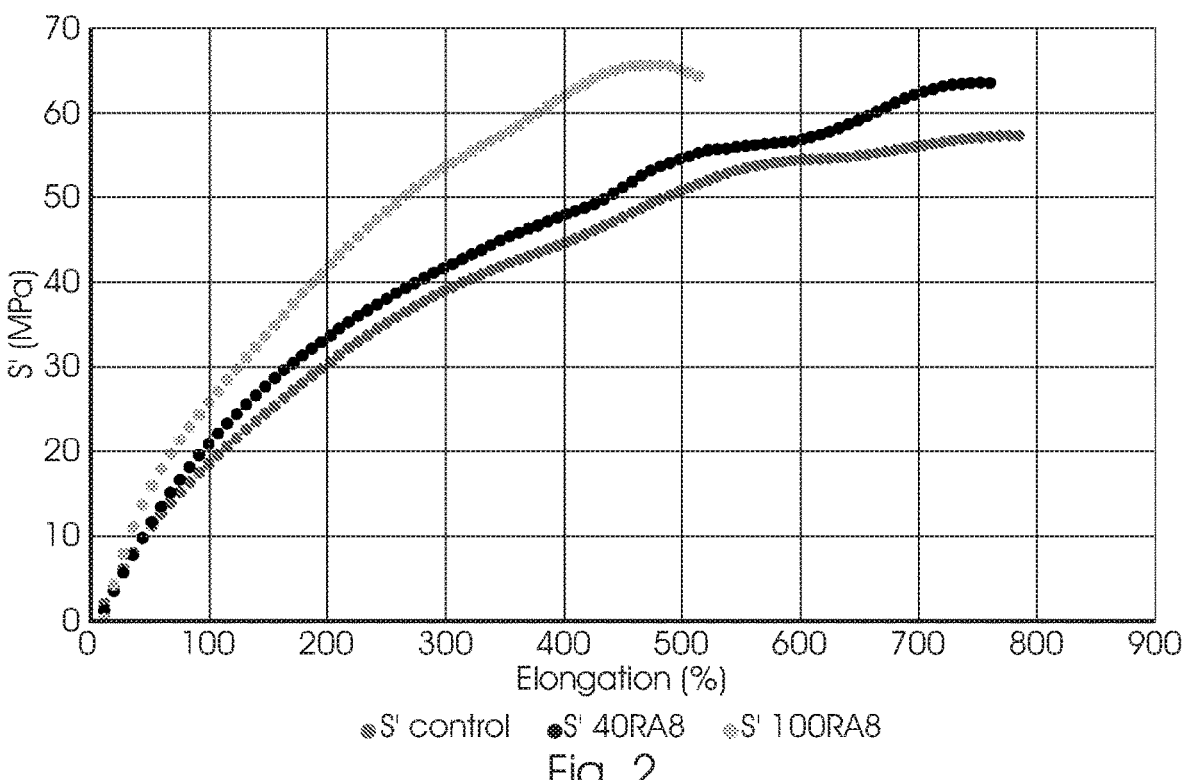
FIG. 2 shows the stress strain responses for a control batch, and rubber formulations comprising 40% and 100% of the rubber formulation prepared with the functionalised elastomeric material of the present invention (Compound A)

As can be seen from FIG. 1 and the results shown in Table 4 above, the addition of the recycled rubber increases the cure speed and affects the modulus (S max and S min) of the compound. There is some change in the scorch time of this compound and this is related to the uncured rubber used to stabilize the recycled material in Compound A. FIG. 2 shows stress strain responses for the formulations comprising 0% Compound A (S' control), 40% Compound A (40RA8), and 100% Compound A (S' 100RA8), respectively.

Example 4: Preparation of Ionic Liquid Based Functionalisation Formulations

Different formulations of an ionic liquid based functionalisation additive according to the invention were produced. These formulations are referred to herein as Formulation S+ and Formulation S− to indicate whether there is a higher amount of sulphur or accelerator (related to normal vulcanization terminology between Efficient Vulcanization (EV) and Conventional vulcanization (CV), wherein CV indicates a higher concentration of sulphur).

TABLE 5

Composition of Formulation S+

Formulation S+

| PxActi8 | 2.5 |
|---|---|
| Silica VN3 | 1 |
| S8 | 4 |

TABLE 5-continued

Composition of Formulation S+

Formulation S+

| TBBS | 1 |
|---|---|
| ZnO | 1 |
| TafMer# | 2 |

Tafmer is a TPE material used to bind the crumb and other ingredients.
Tafmer is a TPE material used to bind the crumb and other ingredients.

TABLE 6

Composition of Formulation S−

Formulation S−

| PxActi8 | 2.5 |
|---|---|
| Silica VN3 | 1 |
| S8 | 0.5 |
| TBBS | 1 |
| ZnO | 1 |
| TafMer# | 2 |

Tafmer is a TPE material used to bind the crumb and other ingredients.
Tafmer is a TPE material used to bind the crumb and other ingredients.

Formulations S+ and S− where used as a functionalisation additive at different ratios to measure and determine the impact on the vulcanization of the resultant reactivated rubber material.

This functionalisation procedure followed in these experiments were the same as that followed in Example 1. This pre-treatment process can be varied to achieve the same kinetic result on the prevulcanization reactions on the rubber surface (i.e. higher temperature for less time).

The functionalisation trend tests were conducted at 0.1, 0.5, 1, and 3 g of Formulations S+ and Formulation S− per 100 g rubber crumb. In these experiments, the functionalisation formulations were found to bind and allow easier further processing at 3 g per 100 g of rubber crumb.

The rheometry of the functionalised rubber crumb with functionalisation formulation S− in a masterbatch, with no additional cure package, is shown in FIG. 3. As can be seen from FIG. 3, it appears that some crosslinking between the rubber crumb and the NR virgin material is apparent around 3 phr of coating of the crumb. It is expected that a coating ratio of higher than 3 phr will impart further vulcanization characteristics on the final vulcanizate.

The rheometry of the functionalised rubber crumb with functionalisation formulation S+ in a masterbatch, with no additional cure package, is shown in FIG. 4. Higher coating ratios, of the functionalisation formulation, can also be considered especially if a very high crumb ratio is required to be vulcanized in the final rubber product.

As can be seen from FIG. 4, there is a rheometric response (as seen by torque rise) in the mix once the coating reaches a certain limit on the surface of the crumb. As is evident the rheometer starts to level out from around 1 phr of coating and then evidence of actual vulcanization in the rest of the rubber (unvulcanised) is evident from the torque rise in the 3% coating trace. This is used to determine from which coating ratio a cure interaction between the crumb and unvulcanised rubber can be achieved. This will be used to tune final vulcanizate properties and determine stability of the mixture if long storage is required.

Example 5: Testing of a Functionalised Rubber Crumb Containing NR Masterbatch The differences of functionalised rubber crumb vs control rubber crumb were evaluated in baseline NR masterbatch materials while using a standard cure package in the virgin rubber masterbatch.

TABLE 7

| NR masterbatch (155 phr) | |
| --- | --- |
| NR (SMR GP) | 100 |
| N550 | 50 |
| Stearic acid | 2 |
| Antioxidant | 2 |
| Antiozonant | 1 |

A standard cure package is included in the rubber masterbatch above including CBS 1.2, ZnO 2, and Sulphur 1.6.

Different rubber crumb materials were introduced at 30 g per 70 g of control rubber.

Figure 5:
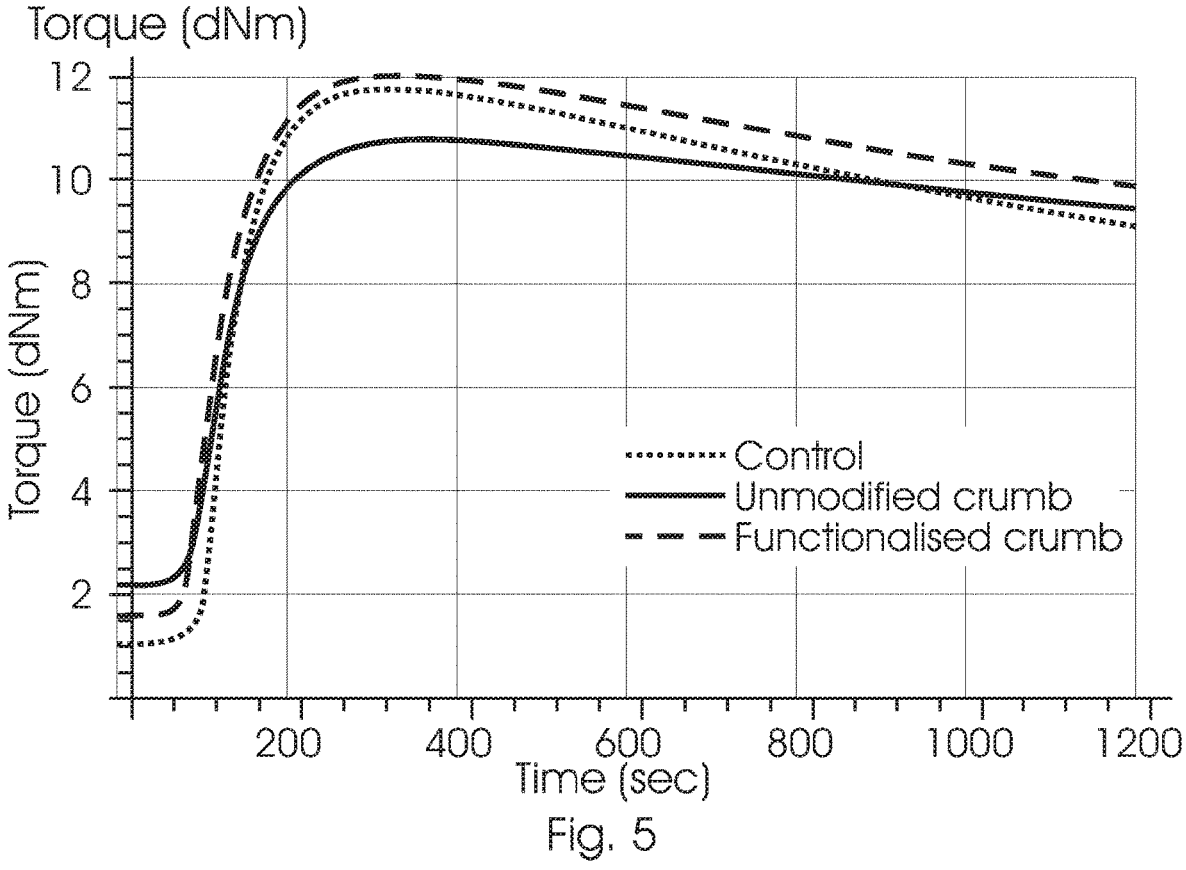
FIG. 5 shows a rheometer trace for a control NR masterbatch with the standard curative package, a control NR masterbatch with unmodified rubber crumb, and a NR masterbatch with functionalised rubber crumb prepared according to the method of the invention (PxActi8 based material)

Three compounds were prepared: 1) a control masterbatch with the standard curative package, 2) a control masterbatch with unmodified rubber crumb, and 3) a masterbatch with functionalised rubber crumb prepared according to the method of the invention (PxActi8 based material). As can be seen from FIG. 5, and as demonstrated by the rheometer trace, a significant difference can be seen in the functionalised rubber crumb material against normal crumb in this NR system.

Various dynamic and physical properties of the NR masterbatch including the functionalised rubber crumb were investigated.

Figure 6:
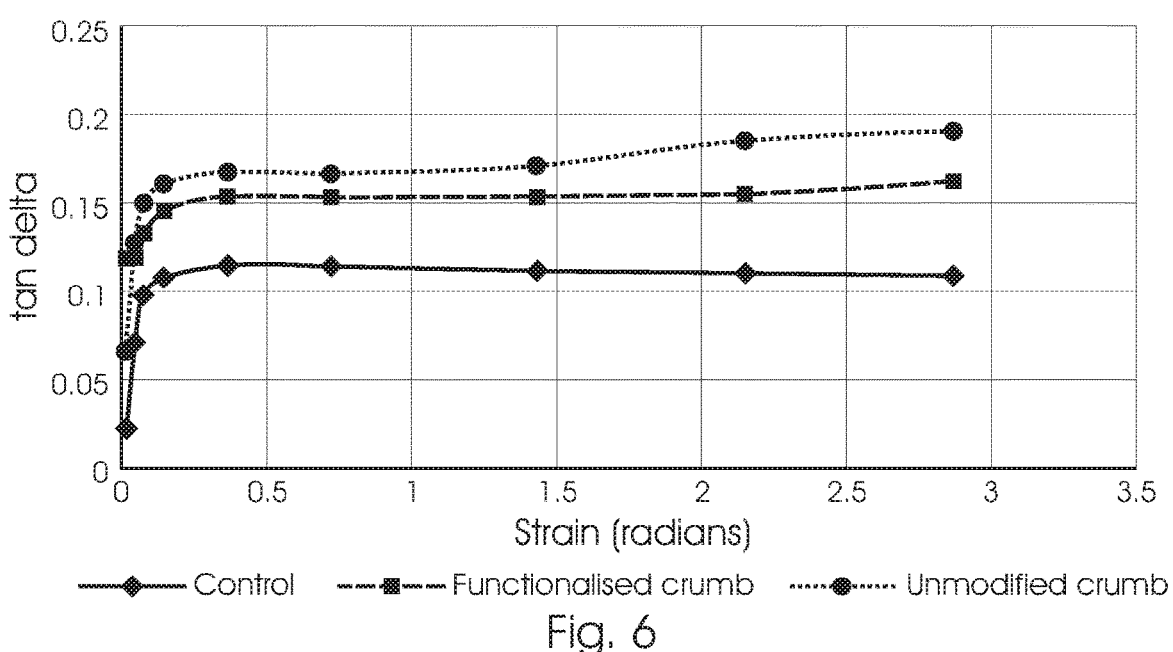
FIG. 6 shows the tan delta response of the NR masterbatches tested.

As can be seen from FIG. 6, the tan delta response of the NR system without any rubber crumb is lower than those containing rubber crumb. There is however an improvement of the dynamic response as measured by tan delta in the sample containing the functionalised rubber crumb. This is an indication of a cure interaction between the crumb and the bulk rubber. The purpose of this is to maximise the dynamic response of the functionalised crumb to create rubber vulcanizates with dynamic response better than what is currently achieved using other crumb sources.

Figure 7:
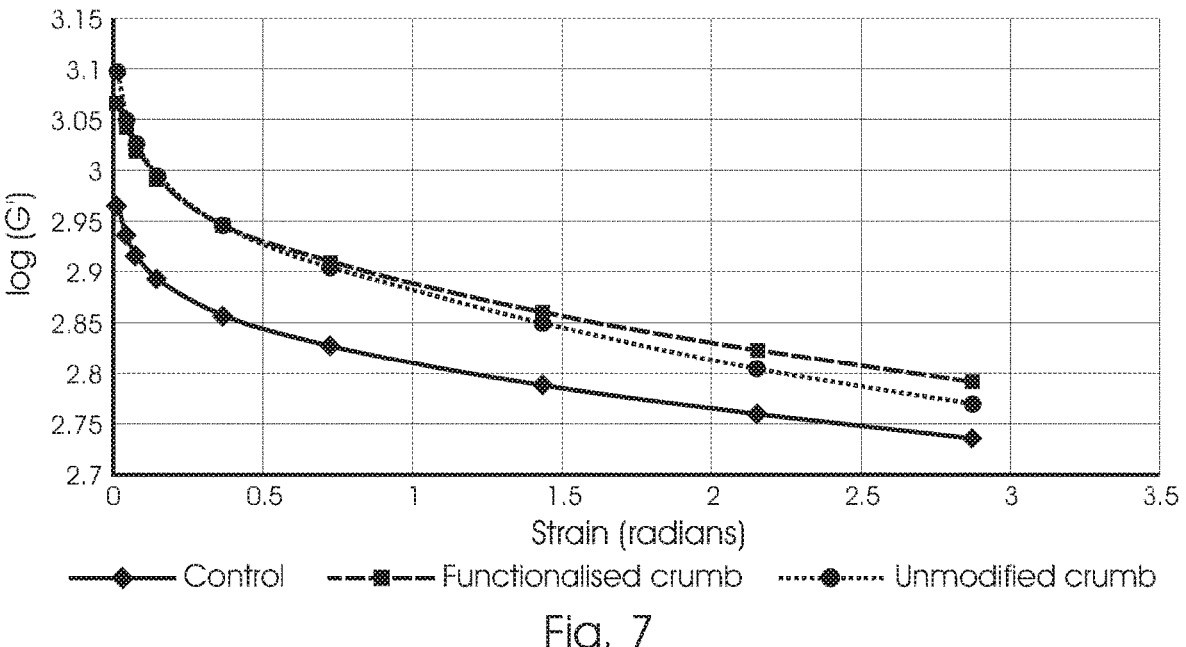
FIG. 7 shows the storage modulus (G') of the NR s masterbatches tested.
Figure 8:
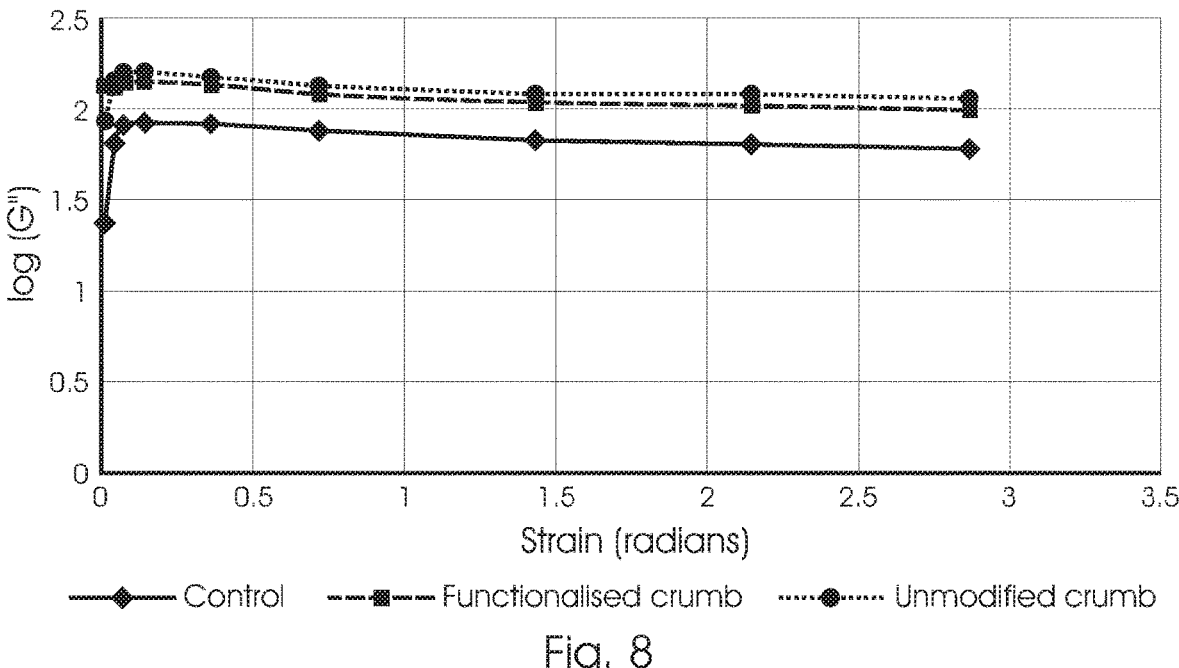
FIG. 8 shows the loss modulus (G") of the NR masterbatches tested.

In FIGS. 7 and 8 storage modulus is presented by G' and loss modulus is presented by G". It is apparent that the crumb introduction in this rubber increases the storage modulus as is evident in the log (G') curve. The reactivated rubber containing the functionalised rubber crumb has slightly higher storage modulus at higher extensions, and this is evidence of a different interaction between this modified rubber crumb and the new rubber phase. Similarly, the loss modulus is slightly lower in the case of the log (G") trace and shows that the reactivated rubber crumb is slightly lower in loss modulus (this is a desirable property variation).

Figure 9:
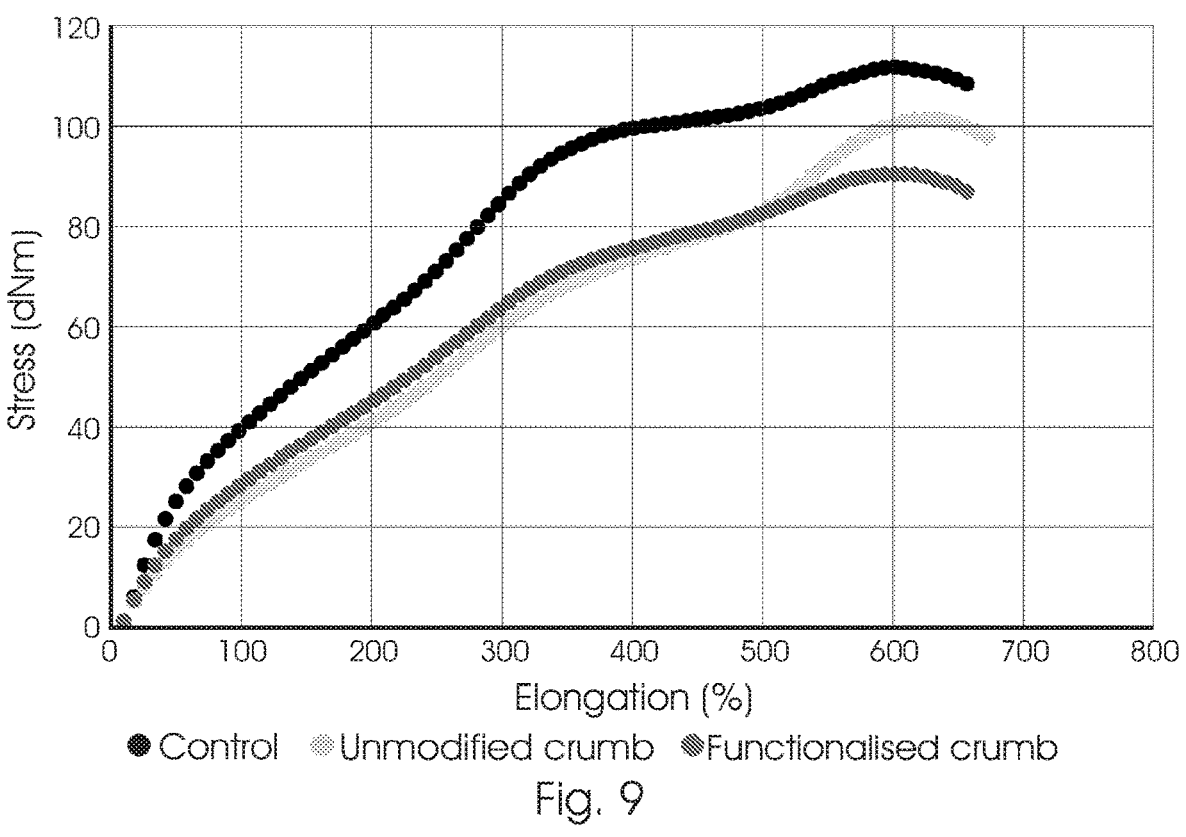
FIG. 9 shows stress vs. strain data for the various NR masterbatch rubber formulations prepared with different rubber crumb materials.

FIG. 9 shows stress v strain data for the examples prepared. From FIG. 9 it can be seen that the stress strain response of the control sample is higher than the modified rubber crumb containing vulcanizates. This is a normal result. The stress strain response of the reactivated rubber containing the functionalised rubber crumb is higher in the lower extensions and is evidence of improved vulcanization and interaction between that rubber crumb and the virgin rubber phase. This is a desired result and will mean higher work strength in the useful range for that rubber, that is, a stress strain response that is higher for the elongation range of normal use for that rubber.

Example 6: Testing of a Functionalised Rubber Crumb Containing SBR Masterbatch The differences of functionalised rubber crumb vs control rubber crumb were evaluated in baseline SBR masterbatch materials while using a standard cure package in the virgin rubber masterbatch.

TABLE 8

| SBR masterbatch (170.2 phr) | |
| --- | --- |
| SBR 1500 | 100 |
| N220 | 30 |
| N330 | 27 |
| Stearic acid | 1 |
| Microwax | 2 |
| 6PPD | 2.2 |
| TDAE Oil | 8 |

A standard cure package is included in the rubber masterbatch above including CBS 1.2, ZnO 2, and Sulphur 1.6.

Again, different rubber crumb materials were introduced at 30 g per 70 g of control rubber.

Figure 10:
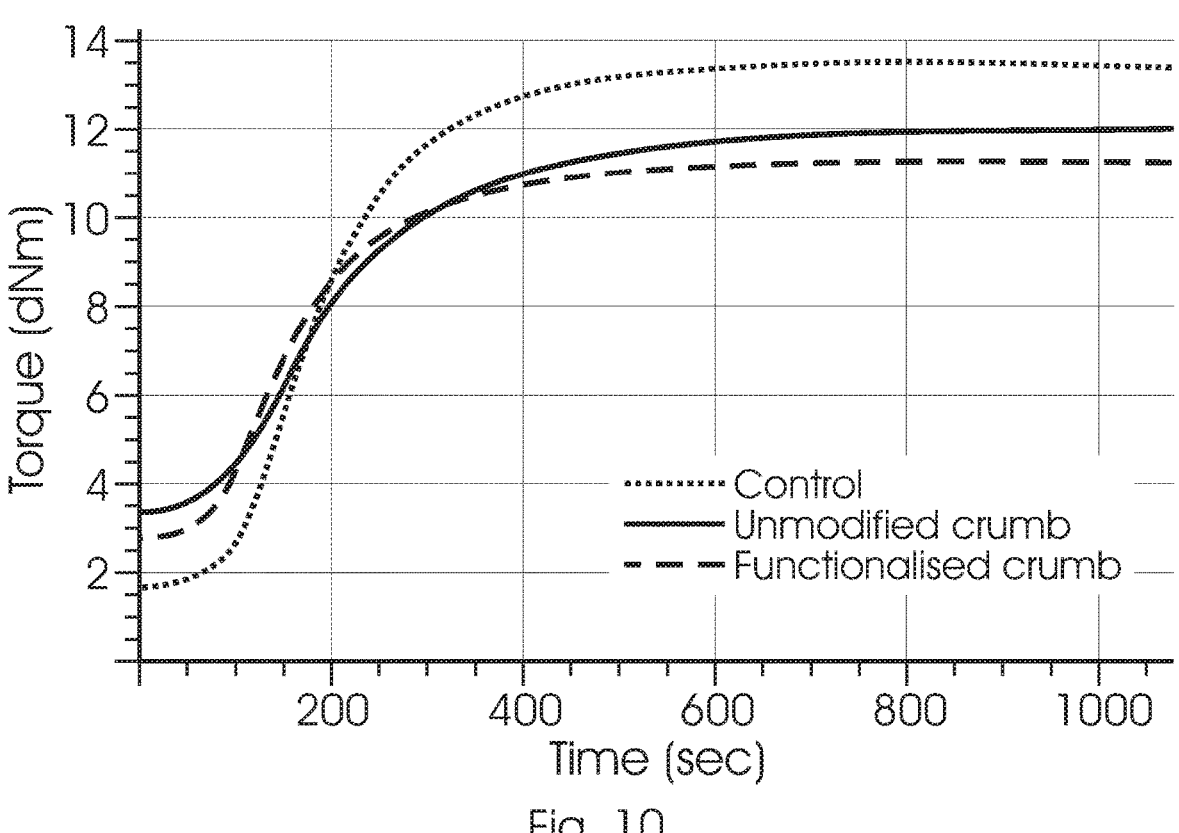
FIG. 10 shows a rheometer trace for a control SBR masterbatch with the standard curative package, a control SBR masterbatch with unmodified rubber crumb, and a SBR masterbatch with functionalised rubber crumb prepared according to the method of the invention (PxActi8 based material)

As can be seen from FIG. 10, in the case of this SBR vulcanizate it is apparent that the modulus response (torque) on the rheometer is lowered by the functionalised rubber crumb. There is also a slight reduction in the torque of the vulcanizate in the early time stage (during the scorch period). This is a desired property as it implies the molten rubber is less viscous and thus easier to form and extrude into its required shape before it cures.

Various dynamic and physical properties of the SBR masterbatch including the functionalised rubber crumb were investigated.

Figure 11:
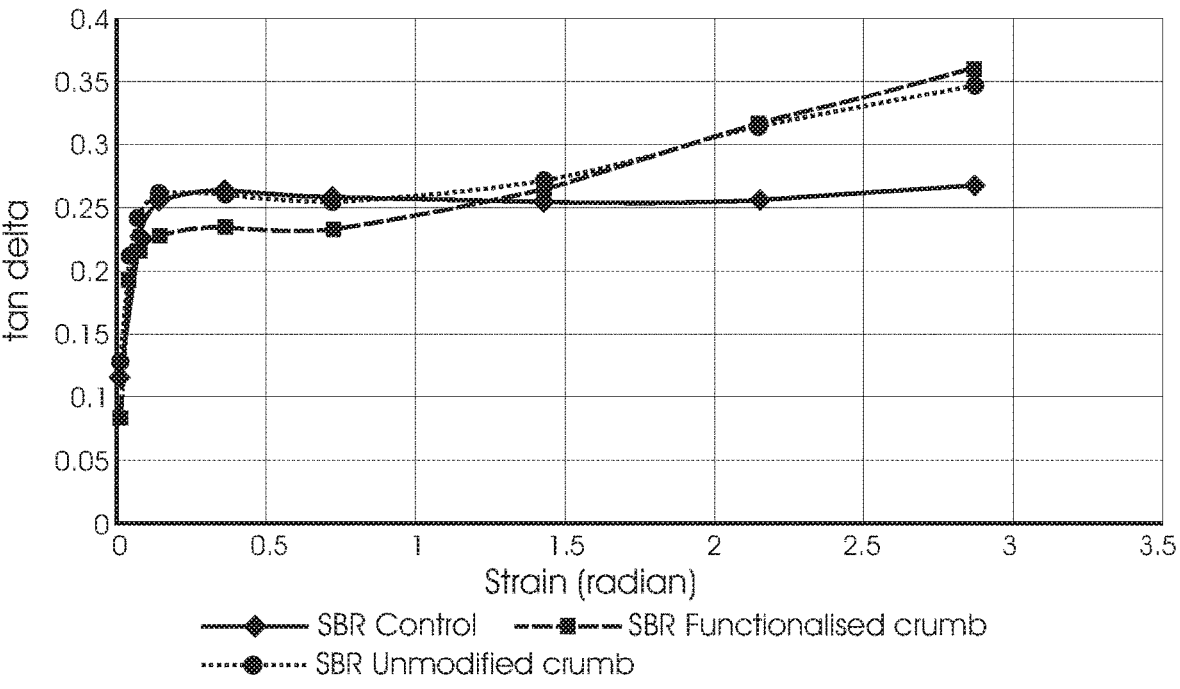
FIG. 11 shows the tan delta response of the SBR masterbatches tested.

As can be seen from FIG. 11, in the case of the SBR vulcanizate the tan delta response of the reactivated rubber containing the functionalised rubber crumb is greatly reduced at extensions up to 1 radian. This is a desired result as it implies lower rolling resistance of this compound (and is significant for dynamic applications). What is also evident is that at higher distortion (radians >1.5) the reactivated rubber seems to behave very much like the ordinary crumb filled material in dynamic response. This is likely due to the crosslink interactions which are stronger at low distortion are now not relevant at high extension and the simple physical presence of the crumb is affecting its dynamics.

Figure 12:
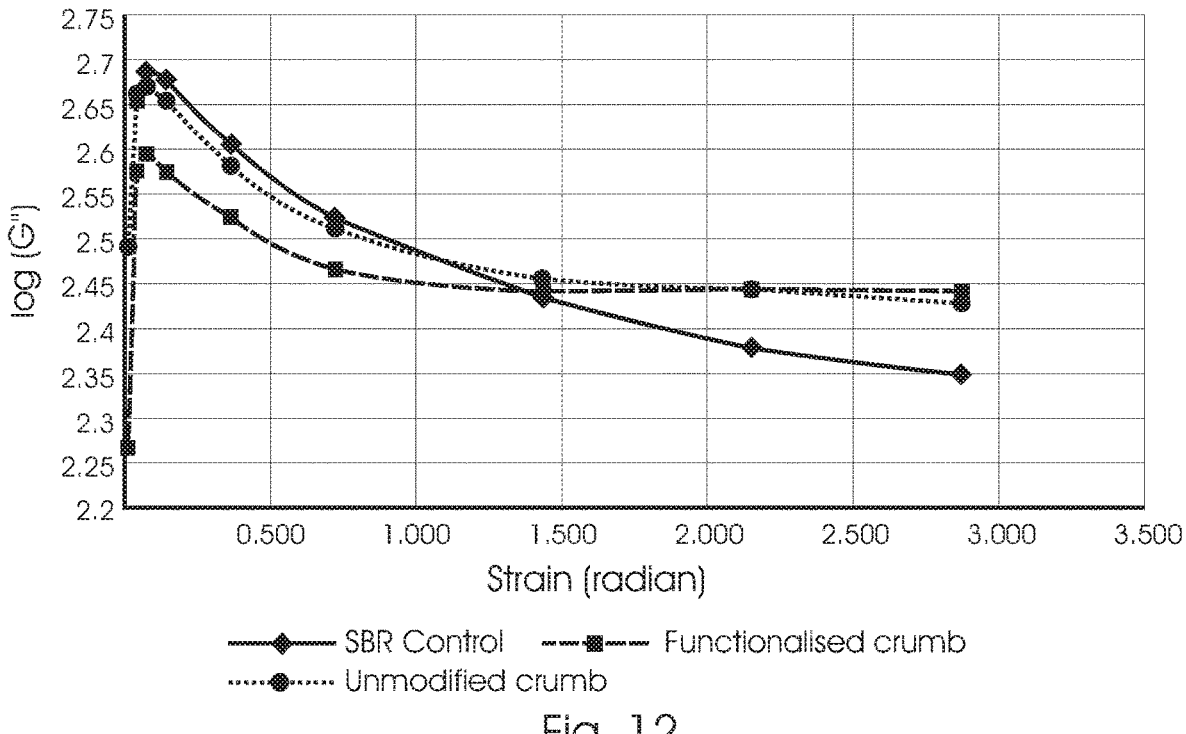
FIG. 12 shows the loss modulus (G") of the SBR masterbatches tested.
Figure 13:
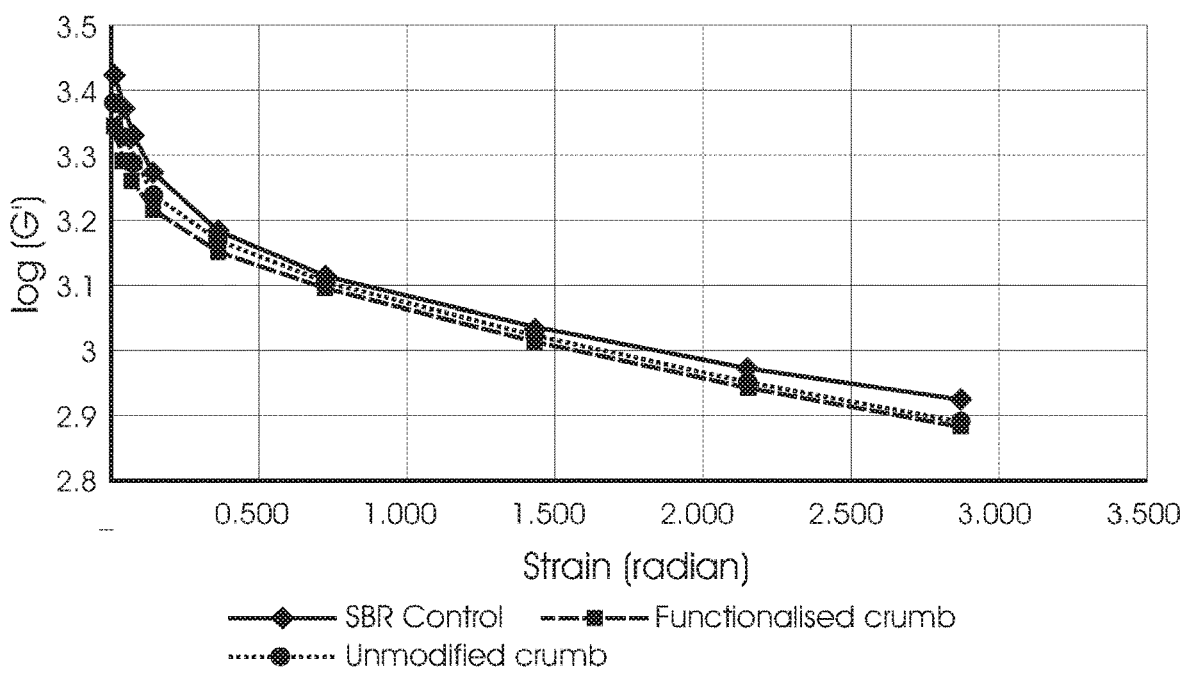
FIG. 13 shows the storage modulus (G') of the SBR masterbatches tested.

As can be seen from FIGS. 12 and 13, these figures support the tan delta conclusions in showing how the behaviour of the reactivated rubber containing the functionalised rubber crumb is more favourable than the control and the control with crumb at lower distortions (a desired property) and then trends to the normal physical presence of the crumb at higher distortions.

The dynamic property implications of the reactivated crumb are apparent. It does not behave like normal crumb at low extension (strain).

Figure 14:
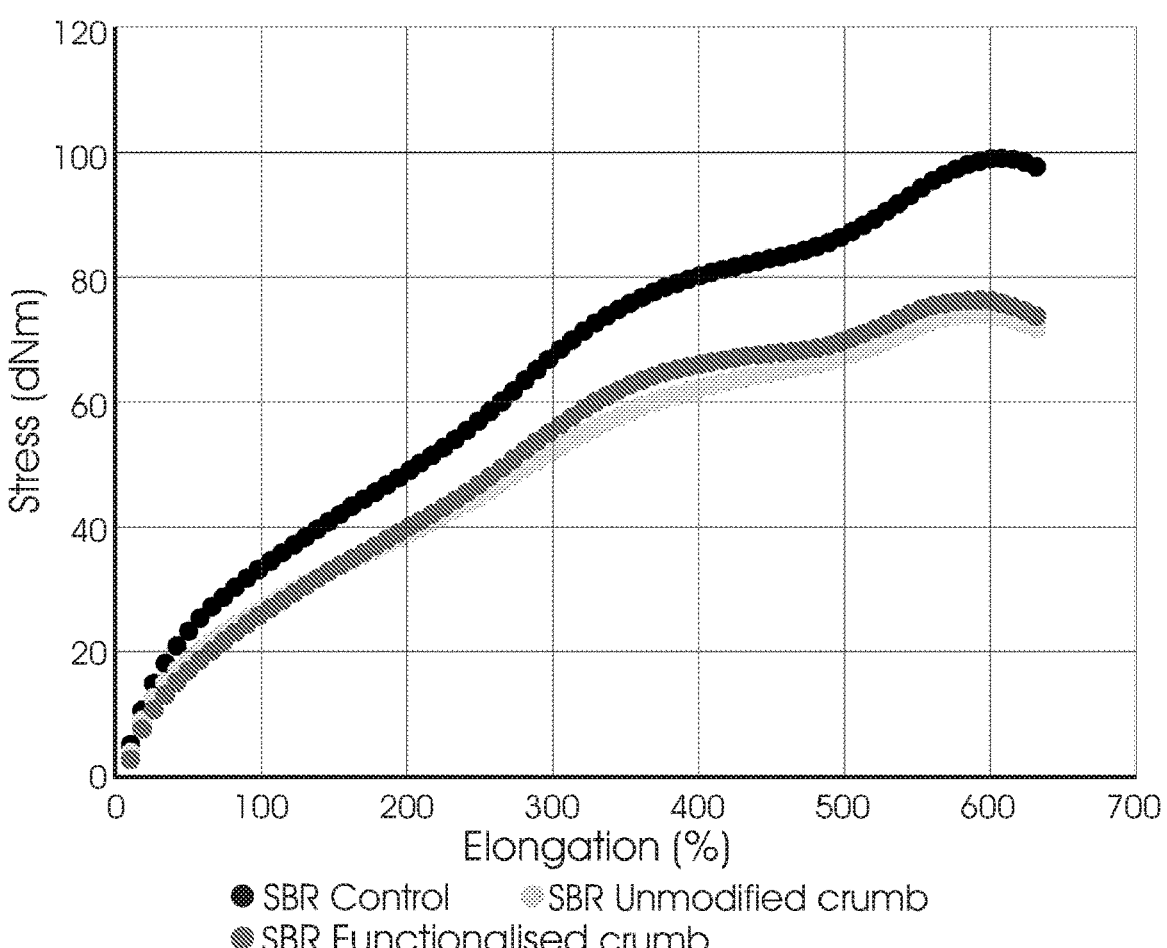
FIG. 14 shows stress v strain data for the SBR masterbatches tested.

FIG. 14 shows stress v strain data for the SBR examples prepared. From FIG. 14 it can be seen that the SBR masterbatch containing the functionalised rubber crumb is slightly stronger.

As can be seen from the experiments detailed above, the masterbatches containing the functionalised rubber crumb is more intimately crosslinked, especially as seen by behaviour at lower ranges of extension (strain) in both dynamic and physical tests. This implies a very good homogenization into the rubber vulcanizate and is expected to translate into good working properties.

This above description of some of the illustrative embodiments of the invention is to indicate how the invention can be made and carried out. Those of ordinary skill in the art will know that various details may be modified thereby arriving at further embodiments, but that many of these embodiments will remain within the scope of the invention.

The invention claimed is:

1. A method of functionalising a vulcanised elastomeric material, the method comprising the steps of:
   a) providing a vulcanised elastomeric material having a surface to be functionalised,
   b) providing an ionic liquid based composition comprising a water soluble polymer, a cationic silicate component, and a salt of a vulcanization accelerator,
   c) providing a zinc compound, sulphur, and an accelerator,
   d) contacting the ionic liquid based composition of step b) and the components of step c) with the vulcanised elastomeric material surface,
thereby to produce a functionalised elastomeric material.

2. The method according to claim 1, wherein the vulcanised elastomeric material is a vulcanised elastomeric particle.

3. The method according to claim 2, wherein the vulcanised elastomeric particle has a particle size range of about 10 to about 400 mesh.

4. The method according to claim 1, wherein the vulcanised elastomeric material is selected from the group consisting of ground rubber, scorched rubber, and micronized rubber powder.

5. The method according to claim 1, wherein the vulcanised elastomeric material is a recycled tyre rubber.

6. The method according to claim 1, wherein the ionic liquid based composition further comprises one or more of a reinforcing filler and a thermoplastic elastomer.

7. The method according to claim 6, wherein the reinforcing filler comprises precipitated silica.

8. The method according to claim 7, wherein the precipitated silica is silane-treated amorphous precipitated silica.

9. The method according to claim 1, wherein the method further comprises mixing the vulcanised elastomeric material of step a) with a reinforcing filler.

10. The method according to claim 1, wherein the vulcanization accelerator in the ionic liquid based composition of step b) is selected from a group of accelerator classes including thiazoles, dithiocarbamates, dithiophosphates, sulfenamides, thiuram sulfides, xanthates, guanidines, and aldehyde amines.

11. The method according to claim 1, wherein the salt of a vulcanization accelerator in the ionic liquid based composition of step b) is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof, and wherein the salt of the vulcanization accelerator is a sodium or potassium salt thereof.

12. The method according to claim 1, wherein the cation of the cationic silicate component is a sodium or potassium cation.

13. The method according to claim 1, wherein the water soluble polymer is an ethylene oxide polymer or polyvinyl alcohol polymer.

14. The method of claim 13, wherein the water soluble polymer is polyethylene glycol.

15. The method according to claim 1, wherein the ionic liquid based composition comprises polyethylene glycol, sodium metasilicate and accelerator salt NaBEC.

16. The method according to claim 1, wherein the accelerator of step c) is selected from a group of accelerator classes including thiazoles, dithiocarbamates, dithiophosphates, sulfenamides, thiuram sulfides, xanthates, guanidines, and aldehyde amines.

* * * * *